US012560511B2

(12) United States Patent
Finkeldey et al.

(10) Patent No.: US 12,560,511 B2
(45) Date of Patent: Feb. 24, 2026

(54) METHOD AND DEVICE FOR MEASURING A TOOTHING

(71) Applicant: Klingelnberg GmbH, Hückeswagen (DE)

(72) Inventors: Markus Finkeldey, Hattingen (DE); Jonas Stefer, Wipperfürth (DE)

(73) Assignee: KLINGELNBERG GMBH, Hückeswagen (DE)

( * ) Notice: Subject to any disclaimer, the term of this patent is extended or adjusted under 35 U.S.C. 154(b) by 0 days.

(21) Appl. No.: 17/587,860

(22) Filed: Jan. 28, 2022

(65) Prior Publication Data

US 2022/0236142 A1 Jul. 28, 2022

(30) Foreign Application Priority Data

Jan. 28, 2021 (DE) ..................... 10 2021 101 957.5

(51) Int. Cl.
| | |
|---|---|
| *G01M 13/021* | (2019.01) |
| *G01B 5/008* | (2006.01) |
| *G01B 11/00* | (2006.01) |
| *G01B 11/02* | (2006.01) |
| *G01B 11/08* | (2006.01) |
| *G01B 11/14* | (2006.01) |

(Continued)

(52) U.S. Cl.
CPC ........... *G01M 13/021* (2013.01); *G01B 5/008* (2013.01); *G01B 11/00* (2013.01); *G01B 11/005* (2013.01); *G01B 11/02* (2013.01); *G01B 11/08* (2013.01); *G01B 11/14* (2013.01); *G01B 11/24* (2013.01); *G01B 11/2416* (2013.01); *G01B 11/2433* (2013.01); *G01B 11/26* (2013.01)

(58) Field of Classification Search
CPC .. G01M 13/021; G01B 11/243; G01B 11/005; G01B 11/2416; G01B 11/26; G01B 11/2433; G01B 11/24; G01B 11/14; G01B 11/08; G01B 11/02; G01B 5/008; G01B 11/00
USPC .......................................................... 73/162
See application file for complete search history.

(56) References Cited

U.S. PATENT DOCUMENTS

| | | | |
|---|---|---|---|
| 2003/0120714 A1* | 6/2003 | Wolff ...................... G06F 18/40 709/200 |
| 2013/0120553 A1* | 5/2013 | Delaney ............... G02B 21/365 348/86 |

(Continued)

FOREIGN PATENT DOCUMENTS

| | | | | |
|---|---|---|---|---|
| AT | 163137 B | 5/1949 | | |
| CN | 108592809 A | * 9/2018 | ............. | G01B 11/08 |

(Continued)

OTHER PUBLICATIONS

Translate DE-102015105171 (Year: 2016).*
Translate CN-108592809 (Year: 2018).*

*Primary Examiner* — Peter J Macchiarolo
*Assistant Examiner* — Monica S Young
(74) *Attorney, Agent, or Firm* — CANTOR COLBURN LLP

(57) ABSTRACT

A method having the steps of measuring a geometry of a toothing using an optical measuring system, wherein a numerical aperture of the optical measuring system is adjustable and the numerical aperture of the optical measuring system is adapted depending on at least one geometric parameter of the toothing to be measured and/or is enlarged or reduced.

9 Claims, 3 Drawing Sheets

(51) Int. Cl.
    *G01B 11/24*         (2006.01)
    *G01B 11/26*         (2006.01)

(56)              References Cited

U.S. PATENT DOCUMENTS

| | | | |
|---|---|---|---|
| 2014/0043470 A1 * | 2/2014 | Winterot | G02B 21/025 |
| | | | 348/135 |
| 2016/0103443 A1 * | 4/2016 | Bryll | G02B 21/0016 |
| | | | 700/114 |
| 2018/0128596 A1 * | 5/2018 | Mies | G01B 11/2416 |
| 2019/0049233 A1 * | 2/2019 | Mies | G01B 11/26 |
| 2019/0064031 A1 * | 2/2019 | Mies | G01M 13/021 |
| 2020/0298362 A1 | 9/2020 | Finkeldey | |

FOREIGN PATENT DOCUMENTS

| | | | | |
|---|---|---|---|---|
| DE | 102015219495 A1 | | 4/2016 | |
| DE | 102015105171 A1 * | 10/2016 | | G01B 11/24 |
| DE | 102018114022 A1 * | 12/2019 | | G01B 11/2416 |
| EP | 3441712 A1 * | 2/2019 | | G01B 11/2416 |
| JP | H0763508 A | | 3/1995 | |
| JP | H07294231 A * | 11/1995 | | |
| JP | 2005257072 A * | 9/2005 | | F16H 1/20 |

* cited by examiner

METHOD AND DEVICE FOR MEASURING A TOOTHING

CROSS-REFERENCE TO RELATED APPLICATIONS

This application is related to and claims the benefit of German Patent Application No. 10 2021 101 957.5, filed on Jan. 28, 2021, the contents of which are herein incorporated by reference in their entirety.

TECHNICAL FIELD

The present disclosure relates to a method and device for measuring toothings.

BACKGROUND

Optical measuring systems are becoming increasingly relevant in gear metrology, as they are coming ever closer to the accuracy of tactile measuring systems and often work much faster than tactile measuring systems.

Tactile pitch measurement is one of the standard measurement tasks in gear analysis and evaluation. Here, e.g. for involute toothing, all distances between involutes are measured on the left side of all teeth and the right side of all teeth, in each case on the pitch diameter and at a previously defined measuring height. A distinction is made between two tactile measuring methods, i.e. pitch measurement via point probing exactly on the pitch diameter and measurement of a section of the flank line on the pitch diameter, with subsequent averaging of the individual measuring points. The measurement based on the flank line provides more robust results, but at the cost of a higher measuring time.

Subsequently, the measurement results are compared with a nominal distance of a nominal geometry of the toothing and, for example, are compared according to VDE or company standards or general standards such as DIN, ISO or AGMA. Measurements on deviating diameters, i.e. not directly on the pitch circle diameter, and one or more measuring heights are possible here.

The measuring time of the tactile pitch measurement is relatively long, especially for the measurement based on the flank line, since each section of a flank line must be measured on each tooth at exactly the right diameter and height. The tactile measuring probe must enter each tooth space without collision, come into contact with the respective tooth flanks and complete two measurements in each tooth space. After the measurements within a tooth space, the probe is retracted, the gear is rotated by one tooth pitch and the measuring process is repeated for the next space.

In principle, such a pitch measurement could be performed with a non-contact measuring optical system with a much shorter measuring time, in which the gear rotates continuously in front of the optical system, wherein no threading into the gap and no probing of the flanks is required. However, the geometry of the toothing can cause shadowing during the optical measurement, so that the required imaging quality is not achieved. This applies not only to the optical pitch measurement, but also to the optical measurement of other geometric features of a toothing, where shadowing can also occur during measurement.

SUMMARY

Against this background, the disclosure is based on the technical problem of specifying a method and a device that enable improved optical gear measurement.

The technical problem described above is solved in each case by the independent claims. Further embodiments of the disclosure result from the dependent claims and the following description.

According to a first aspect, the disclosure relates to a method comprising the method steps: measuring a geometry of a toothing by means of an optical measuring system, wherein a numerical aperture of the optical measuring system is adjustable and wherein the numerical aperture of the optical measuring system is adapted depending on at least one geometric parameter of the toothing to be measured. Alternatively or additionally, the numerical aperture of the optical measuring system is increased and/or decreased depending on at least one geometric parameter of the toothing to be measured.

By adjusting or adapting the numerical aperture to the geometry of the toothing, shadowing during the optical measurement in particular can be completely avoided or reduced. Thus, although a maximum possible measurement resolution is reduced for the optical measurement due to the possibly reduced numerical aperture, an essentially complete imaging with essentially full backscattered illumination intensity is ensured, since shadowing is completely avoided or reduced during the optical measurement.

When the term "measurement of a geometry of the toothing" is used, this refers in particular to the metrological determination of actual values of one or more geometric parameters of the toothing, such as profile shape, flank shape, number of teeth, outside diameter, tooth pitch, gap width, module, helix angle, spiral angle, tip cone, root cone, tip relief, root relief, end relief, profile crowning, width crowning or the like. For this purpose, for example, individual points and/or profile lines and/or flank lines of tooth flanks of the teeth of the toothing can be measured.

The adaptation and/or enlargement and/or reduction of the numerical aperture is carried out in particular on the basis of at least one known nominal value of at least one geometric parameter of the toothing to be measured. In operational practice, in most cases no completely unknown toothing is measured. For example, data on a nominal geometry of the toothing is usually stored in a data memory for measurements that are performed during production as part of a quality control process.

The adjustment of the numerical aperture can be carried out in an automated manner, in particular, on the basis of at least one known nominal value of at least one geometrical parameter of the toothing to be measured. This can be, for example, nominal values of one or more geometric parameters of the toothing, such as outer diameter, number of teeth, helix angle, spiral angle, pitch direction, spiral direction, module, tooth pitch, gap width or the like.

It can be provided that the geometric parameter is a tooth pitch or a gap width of the toothing.

In particular, this is the tooth pitch at the level of a pitch circle diameter of the toothing, for example the normal pitch or the face pitch on the pitch circle. Alternatively, the tooth pitch can be specified at the level of a tip circle diameter or a root circle diameter of the toothing.

Similarly, a gap width of the toothing can be specified at the height of the pitch circle in the normal or face section. Alternatively, the gap width can be specified at the level of a tip circle diameter or a root circle diameter of the toothing.

The gap width is the distance between two adjacent tooth flanks of the toothing facing each other, e.g. the distance between a left flank of a first tooth and a right flank of a second, adjacent tooth. The gap width can be, for example, a tooth gap width at the level of a pitch circle diameter or a tooth gap base width in the root area of the toothing. Furthermore, the gap width can be a tooth gap width at the level of a tip circle diameter.

The numerical aperture can, for example, be selected larger for toothing with a large tooth pitch than for toothing with a smaller tooth pitch. In other words, the clear width of a tooth space is taken into account for a particular measurement task so that, in particular, there is no shadowing during the optical measurement or there is only minor shadowing during the optical measurement.

One, two or more geometric parameters of the toothing can be considered for adjusting the numerical aperture, in particular selected from the following listed parameters: Profile shape, flank shape, number of teeth, outside diameter, tooth pitch, gap width, module, helix angle, spiral angle, tip cone, root cone, tip relief, root relief, end relief, profile crowning, width crowning or the like.

According to one embodiment of the method, it can be provided that edge beams of the optical measuring system are not shadowed by one tooth of the toothing or by several teeth of the toothing. The numerical aperture is adapted to the geometry of the toothing and/or is enlarged or reduced in such a way that a measuring point is completely imaged.

According to one embodiment of the method, it can be provided that a first flank and/or profile section of the toothing is measured with a larger numerical aperture than a second flank and/or profile section of the toothing. The numerical aperture can therefore be set larger or smaller depending on the tooth height at which the measuring points to be detected for a respective measuring section are located. If a measuring point is located close to the tooth tip, it can be measured with a higher numerical aperture than a measuring point located deeper in the tooth space, i.e. close to the tooth root, in order to avoid or reduce shadowing.

Alternatively or additionally, it can be provided that the numerical aperture is adjusted during the measurement along a measurement path. For example, the numerical aperture can be increased or reduced along a measurement path. For example, the numerical aperture can be increased or reduced along a measurement path in steps or continuously.

Alternatively or additionally, it can be provided that the numerical aperture is periodically increased and reduced over the angle of rotation of the toothing. If the toothing to be measured is rotated during the measurement, for example in front of the optical measuring system, the head, flank and root segments of the teeth alternate successively. Accordingly, the aperture can also be adjusted in steps between, for example, two or more steps or continuously adjusted.

Alternatively or additionally, the numerical aperture can be kept constant during the optical measurement. For example, for a measurement task, the largest possible numerical aperture can be determined for which no shadowing occurs for any of the measurement points to be detected. In other words, the respective maximum numerical aperture can be determined for each of the measuring points to be detected and the minimum aperture can be selected from these values. It is true that some measuring points may not be measured with the largest possible aperture for these specific measuring points. However, a high imaging quality is guaranteed for all measuring points.

In particular, the numerical aperture can be adjusted automatically.

According to one embodiment of the method, it is provided that the numerical aperture for a measuring point is set on the basis of a light intensity detected by means of an image sensor, wherein in particular that aperture is set for which a maximum intensity is detected at constant illuminance of a light source.

Alternatively or additionally, it can be provided that the numerical aperture is determined computationally, in particular on the basis of a predetermined nominal geometry of the toothing and a predetermined measuring angle. If the nominal geometry and a measuring angle, i.e. the inclination of the optical axis of the optical measuring system relative to the toothing to be measured, are known, the numerical aperture can be adapted by calculation, for example, in such a way that edge beams of a light cone of the optical measuring system are not shadowed during the optical measurement. Furthermore, a specified tolerance range of the toothing can be taken into account and added to the nominal geometry as an allowance.

According to one embodiment of the toothing, the optical measurement system comprises a confocal sensor, wherein the geometry of the toothing is detected by confocal distance measurement, in particular by confocal chromatic distance measurement.

Alternatively or additionally, it can be provided that a geometry of the toothing can be measured by means of a tactile measuring system.

In particular, it can be provided that both a measurement by means of the tactile measuring system and a measurement with the optical measuring system are carried out. In particular, individual measuring points detected in a tactile manner can serve as reference or support points for an evaluation of optically measured measuring points.

According to a second aspect, the disclosure relates to a method comprising the steps of: measuring a geometry of a first toothing according to a method according to the disclosure described above; measuring a geometry of a second toothing according to a method according to the disclosure described above; wherein the first toothing has a different geometry from the second toothing; wherein the first toothing is measured with a first numerical aperture; wherein the second toothing is measured with a second numerical aperture and wherein the first numerical aperture is different from the second numerical aperture.

For example, if two sets of toothing of different geometry are measured consecutively on one and the same measuring machine, the numerical aperture can be adapted to the specific toothing in order to avoid or reduce shadowing during the respective optical measurement.

For example, the first and second toothing may differ in terms of their module, helix angle, or other features that determine the respective geometry.

According to a third aspect, the disclosure relates to a device for measuring toothings, comprising an optical measuring system for measuring a geometry of a toothing; a receptacle for retaining a toothing to be measured; and a controller for controlling a measuring sequence, wherein the controller is set up for carrying out a method according to the disclosure.

For example, the device may be a coordinate measuring machine, which is a gear measuring machine. The gear measuring machine may have a spindle for holding and rotating a toothing to be measured.

The gear measuring machine can have a plurality of CNC controlled axes.

It can be provided that the optical measuring system has a lens system with adjustable focal length. Alternatively or additionally, the optical measuring system can have a lens with an adjustable focal length, a so-called adaptive lens.

The device may have a tactile measuring system for measuring a geometry of a toothing. Alternatively or additionally, the optical measuring system may have a confocal sensor, in particular a confocal chromatic sensor.

BRIEF DESCRIPTION OF THE DRAWINGS

The disclosure is described in more detail below with reference to a drawing illustrating exemplary embodiments. The drawings each show schematically as follows.

DETAILED DESCRIPTION OF THE DRAWINGS

Figure 1:
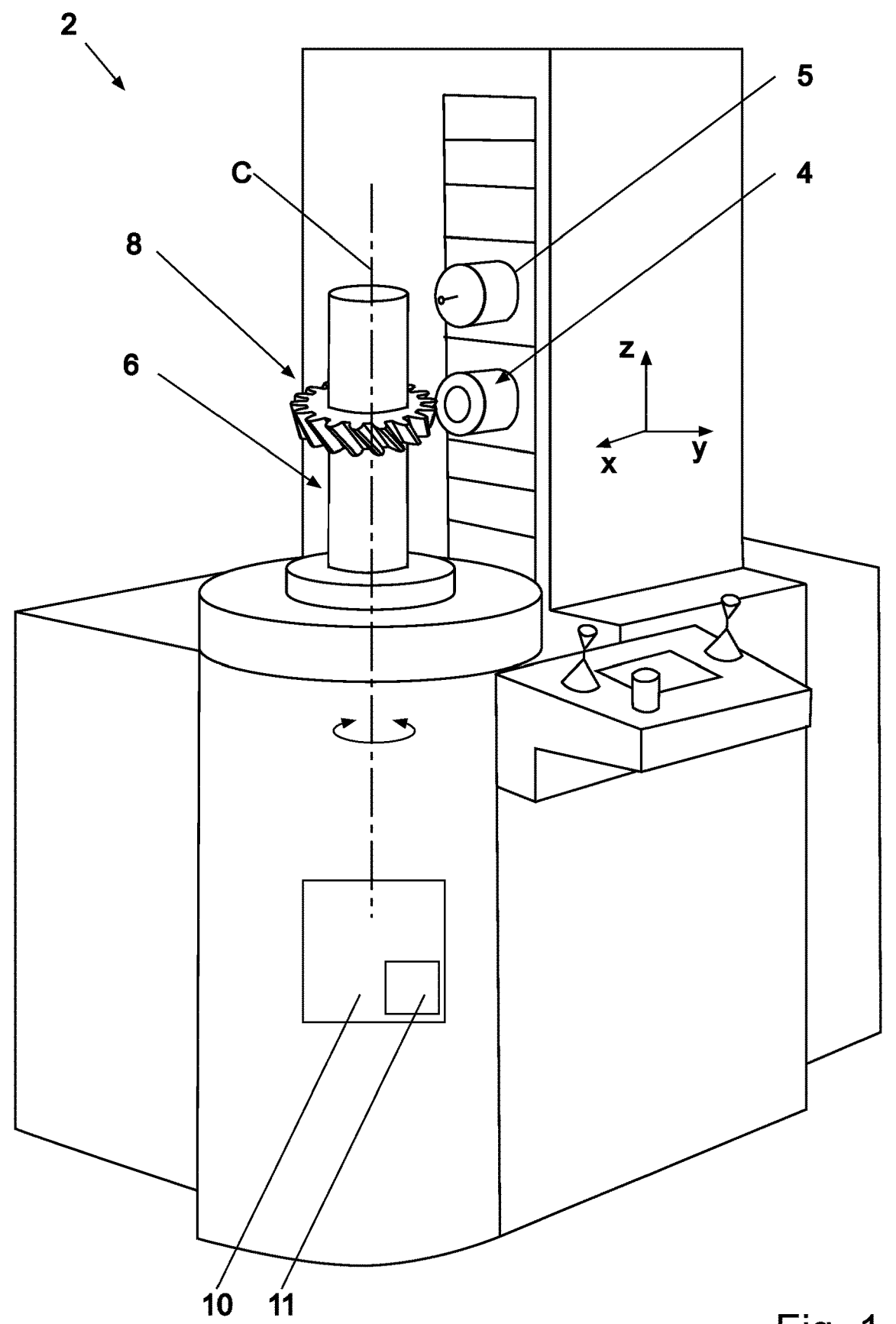
FIG. 1 a device according to the disclosure for measuring a toothing.

FIG. 1 shows a device 2 for measuring a toothing. The device 2 has an optical measuring system 4 for measuring a geometry of a toothing. The device 2 has a tactile measuring system 5 for measuring a geometry of a toothing. The device 2 has a receptacle 6 for retaining a toothing 8 to be measured and a controller 10 for controlling a measuring sequence.

The controller 10 is set up for carrying out a method according to the disclosure, having the method steps of: measuring a geometry of the toothing 8 by means of the optical measuring system 4, wherein a numerical aperture of the optical measuring system 4 can be set, and wherein the numerical aperture of the optical measuring system is adapted depending on at least one geometric parameter of the toothing 8 to be measured and/or is increased or decreased.

At least one nominal value of the at least one geometric parameter is stored in a data memory 11, which is part of the controller 10 or to which the controller 10 has access. The nominal value can, for example, be a nominal value known from a toothing design of the toothing to be measured.

The toothing can be rotated about an axis C. The optical measuring system 4 can be moved translationally in the x, y and z directions. The axis movements can be controlled by the controller 10.

Figures 2, 3:
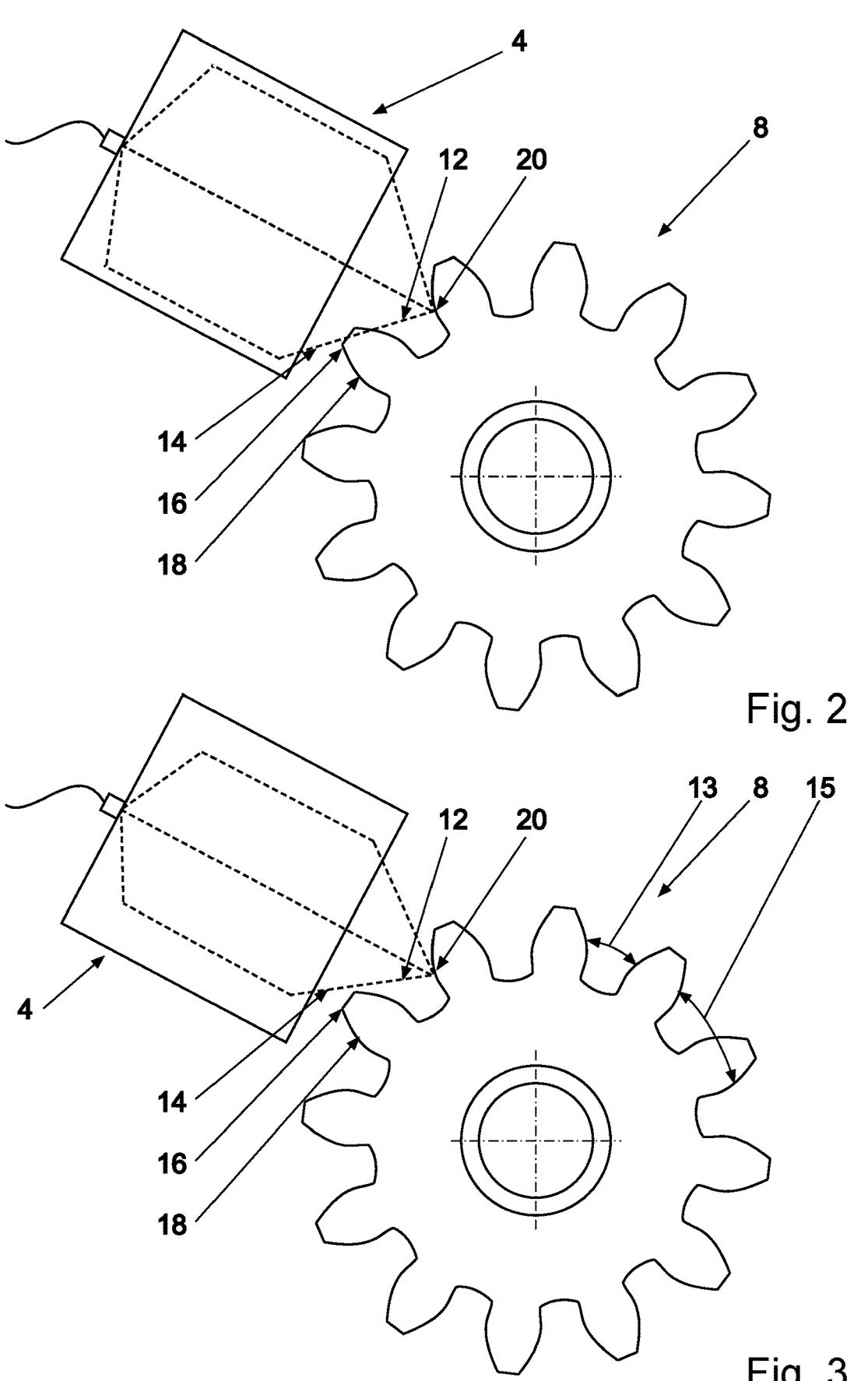
FIG. 2 an optical measurement with a shading.
FIG. 3 an optical measurement without shading.

FIG. 2 shows an optical measurement of the toothing 8 with the optical measuring system 4. Here, an edge beam 12 of a light cone 14 is shadowed by a tooth tip 16 of a tooth 18 of the toothing 8 and therefore does not contribute to the imaging of a measuring point 20. According to the disclosure, such shadowing is to be avoided in particular partially or completely.

The numerical aperture is therefore adapted to the geometry of the toothing 8 according to FIG. 3, in which e.g. a tooth pitch 15 and/or gap width 13 of the toothing 8 is taken into account. As can be seen from FIG. 3, the numerical aperture of the optical measuring system 4 has been reduced so that the edge beam 12 of the light cone 14 is no longer shadowed by the tooth tip 16 of the tooth 18.

The optical measuring system 4 is a device for confocal chromatic distance measurement.

Figure 4:
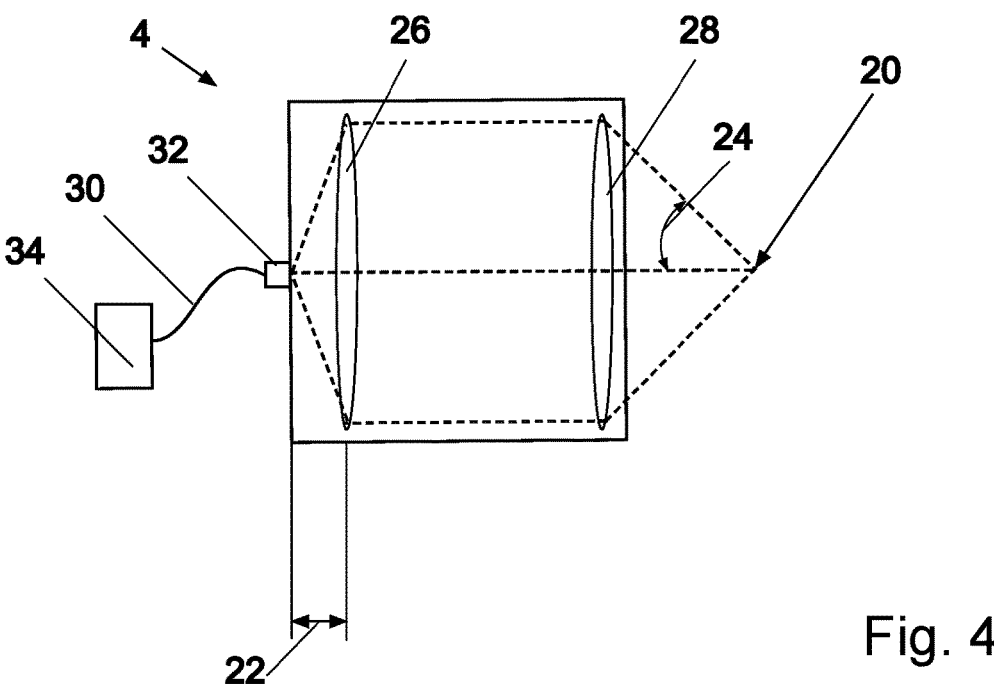
FIG. 4 an optical measuring system.

The numerical aperture NA of the optical system 4 is defined in a known manner as the sine of half the object-side aperture angle 24 of the optical system 4 multiplied by a refractive index, which is 1 for air, for example (FIG. 4).

To reduce the numerical aperture, a distance 22 of a collimator lens 26 from an optical fiber 30 can be reduced to reduce the illumination of a focus lens 28. In order to still maximize the light output, the focus of the collimator lens 26 should be on a fiber output 32 of the optical fiber 30 coupled to a light source 34 and matched to the numerical aperture of the optical fiber 30.

Figure 5A:
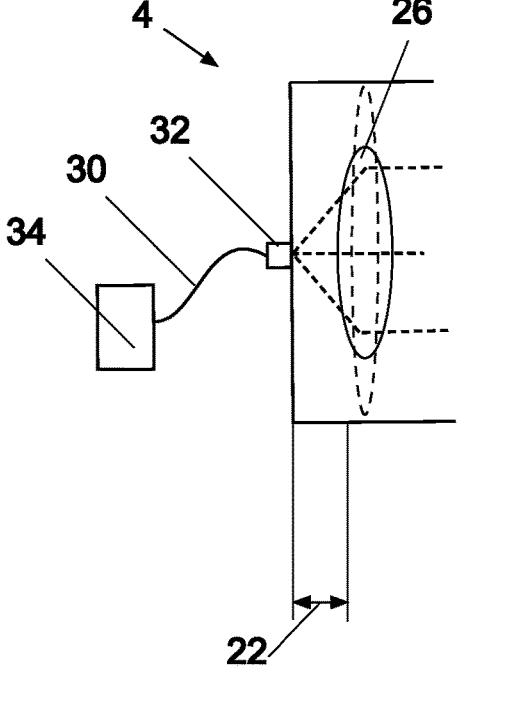
FIG. 5A the optical measuring system with an adaptive lens.
Figure 5A:
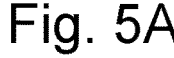

To this end, the collimator lens 26 may be designed as an adaptive lens 26 with an adjustable focal length, as shown in FIG. 5A.

Figure 5B:
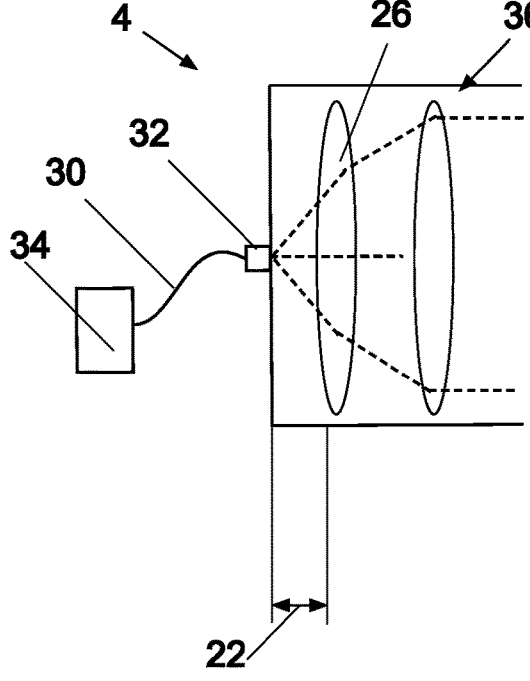
FIG. 5B the optical measuring system with a lens system.

Alternatively or additionally, this can be accomplished by a variable focal length lens system 36, as shown in FIG. 5B.

The invention claimed is:

1. A method including the following steps:

measuring a geometry of a toothing using an optical measuring system, wherein a numerical aperture of the optical measuring system is adjustable and is adapted, increased, or decreased, wherein the optical measuring system generates illumination beams, depending on at least one geometric parameter of the toothing to be measured, wherein at least one of the following requirements are fulfilled to adapt, increase or decrease the numerical aperture to the toothing to be measured:

the geometric parameter is a tooth pitch or a gap width of the toothing, edge beams of the illumination beams of the optical measuring system are not shadowed by a tooth of the toothing, the numerical aperture is determined by calculation, on the basis of a predetermined nominal geometry of the toothing and a predetermined measuring angle.

2. The method according to claim 1, wherein a first flank and/or profile section of the toothing is measured with a larger numerical aperture than a second flank and/or profile section of the toothing and/or the numerical aperture is adjusted during the measurement along a measurement path.

3. The method according to claim 1, wherein the optical measuring system has a confocal sensor, wherein the geometry of the toothing is detected by confocal distance measurement.

4. The method including the following steps:

measuring both a geometry of a first toothing and a geometry of a second toothing according to the method recited in claim 1;

wherein the first toothing has a geometry different from the second toothing, and wherein the first toothing is measured with a first numerical aperture, wherein the second toothing is measured with a second numerical aperture and wherein the first numerical aperture is different from the second numerical aperture.

5. The method according to claim 1, wherein, in addition to the optical measurement, a measurement of a geometry of the toothing is carried out using a tactile measuring system.

6. The device according to claim 4, wherein the optical measuring system has a confocal sensor.

7. A device for measuring toothings comprising:

an optical measuring system for measuring a geometry of a toothing;

a receptacle configured to retain a toothing to be measured and having a controller for controlling a measuring sequence, wherein the controller is arranged to measure the geometry of the toothing using the optical measuring system, wherein the optical measuring system is configured to generate illumination beams, wherein a numerical aperture of the optical measuring system is adjustable and is adapted, increased, or decreased, depending on at least one geometric parameter of the toothing depending on at least one geometric parameter of the toothing to be measured, wherein at least one of the following requirements are fulfilled to adapt, increase or decrease the numerical aperture to the toothing to be measured:

the geometric parameter is a tooth pitch or a gap width of the toothing, edge beams of the illumination beams of the optical measuring system are not shadowed by a tooth of the toothing, the numerical aperture is determined by calculation, on the basis of a predetermined nominal geometry of the toothing and a predetermined measuring angle.

8. The device according to claim 7, wherein the optical measuring system has a lens system with adjustable focal length, and/or the optical measuring system has a lens with adjustable focal length.

9. The device according to claim 7, wherein a tactile measuring system is provided for measuring a geometry of a toothing, and/or the optical measuring system has a confocal sensor.

* * * * *